United States Patent [19]

Yamamoto, Yushin et al.

[11] Patent Number: 4,891,744
[45] Date of Patent: Jan. 2, 1990

[54] POWER CONVERTER CONTROL CIRCUIT

[75] Inventors: Yamamoto, Yushin; Takeshi Miyashita, both of Hyogo,, Japan

[73] Assignee: Mitsubishi Denki Kaubshiki Kaisha, Tokyo, Japan

[21] Appl. No.: 250,565

[22] Filed: Sep. 29, 1988

[30] Foreign Application Priority Data

Nov. 20, 1987 [JP] Japan .................................. 62-239646

[51] Int. Cl.$^4$ .............................................. H02M 7/12
[52] U.S. Cl. ........................................ 363/89; 363/37
[58] Field of Search ...................... 363/56, 77, 78, 79, 363/84, 85, 86, 87, 88, 89, 37

[56] References Cited

U.S. PATENT DOCUMENTS 3,859,586  1/1975  Wadlington ........................... 363/56
4,468,724  8/1984  Omae et al. ............................ 363/88
4,666,020  5/1987  Watanabe .......................... 363/37 X
4,719,552  1/1988  Albach et al. ..................... 363/89 X

FOREIGN PATENT DOCUMENTS 0070328  4/1983  Japan ..................................... 363/87

Primary Examiner—Patrick R. Salce
Assistant Examiner—Kristine Peckman
Attorney, Agent, or Firm—Bernard, Rothwell & Brown

[57] ABSTRACT

A control circuit for an a.c. to d.c. power converter, in which the load current of the power converter is detected and averaged, and it is added to the voltage control signal of the voltage control system which controls the converter output voltage to be constant, so that the converter control is less affected by the ripple of the load current.

7 Claims, 7 Drawing Sheets

POWER CONVERTER CONTROL CIRCUIT

BACKGROUND OF THE INVENTION

1. Field of the Invention

The present invention relates to a control circuit of power converter, and particularly to a converter control circuit which controls the d.c. output voltage to be constant and the input current to be in phase with the power voltage.

2. Description of the Prior Art

FIG. 1 shows in block diagram a conventional power converter control circuit disclosed in an article entitled "Review of Control Characteristics of PWM Converters", in the proceeding of the 1985 national convention of The Institute of Electrical Engineers of Japan. In the figure, indicated by 1 is a power converter, which is a PWM converter in this example. Indicated by 2 is an a.c. filter reactor provided at the a.c. input of the converter 1, 3 is an a.c. power source which supplies an input current $I_S$, 4 is a d.c. filter capacitor provided at the d.c. output of the converter 1, 5 is a load, 6a is a power voltage $V_S$ detecting circuit, 6b is a d.c. output voltage $V_D$ detecting circuit, 6c is an input current $I_S$ detecting circuit, and 6d is a load current $I_L$ detecting circuit.

Indicated in FIG. 1 are sections of a control circuit, in which are included a reference voltage generating circuit 101 for producing a reference voltage $V_{DR'}$ a subtracter 102 which calculates the difference between the detected voltage $V_D$ provided by the detecting circuit 6b and the reference voltage $V_{DR}$ to evaluate the voltage difference, a voltage control circuit 103 which produces a voltage control signal depending on the voltage difference, a feed-forward control circuit 107a which produces a feed-forward signal derived from the detected value $I_L$ from the detecting circuit 6d multiplied by a constant $K_L$, an adder 107 which calculates the difference between the voltage control signal and the feed-forward signal to produce an input current peak command $I_m$, a sinusoidal wave generating circuit 108 which produces a sinusoidal waveform $\sin \theta$ in phase with the power source voltage $V_S$ based on the detected value $V_S$ of the detecting circuit 6a, a multiplier 109 which multiplies the peak command $I_m$ and the sinusoidal waveform $\sin \theta$ to produce an input current command $I_{SS}$, a subtracter 111 which calculates the difference between the detected value $I_S$ from the detecting circuit 6c and the input current command $I_{SS}$ to evaluate the current difference, a current control circuit 112 for producing a current control signal depending on the current difference, an adder 113 which adds the detected value $V_S$ of the detecting circuit 6a to the current control signal to compensate the disturbance of the power voltage $V_S$, a carrier wave generating circuit 115 which produces a carrier signal, e.g., a triangular wave, a PWM (pulse-width modulation) circuit 114 which compares the output of adder 113 with the carrier wave to time the switching operation of switching devices (not shown) constituting the converter 1, and drive circuit 116 which activates the converter 1 depending on the output pulse width provided by the PWM circuit 114.

Next, the operation of the above converter system will be described. The converter 1 converts a.c. input power into d.c. power and supplies it to the load 5. The capacitor 4 is provided for absorbing the variation in the d.c. output voltage $V_D$ of the converter 1. The control circuit controls the d.c. output voltage $V_D$ so that it is equal to the reference voltage $V_{DR}$, and also causes the input current $I_S$ to be sinusoidal in phase with the power voltage $V_S$ so that the system operates at a 100% power factor, with less harmonics and lower distortion factor.

In order to maintain a constant d.c. output voltage $V_D$, the voltage control circuit 103 provides a voltage control signal for modifying the peak value of the input current $I_S$. If the voltage control has a laggard response, an abrupt fall of the d.c. output voltage $V_D$ across the capacitor 4 could cause a control disability, and this problem is overcome by adding a feed-forward signal with a value of $K_L I_L$ to the voltage control signal on the adder 107 so that the peak value command $I_m$ is instantaneously responsive to a load variation.

The input current command $I_{SS}$ is produced through the multiplication of the peak value command $I_m$ and the sinusoidal waveform $\sin \theta$ in phase with the power voltage $V_S$ on the multiplier 109. The input current command $I_{SS}$ is subtracted by the input current $I_S$ on the subtracter 111 to evaluate the current difference, which is followed by the current control circuit 112 to produce the current control signal. The current control signal is added by the power voltage $V_S$ on the adder 113 so that the disturbance by the power voltage $V_S$ is compensated, and then the resulting signal is fed to the PWM circuit 114. The PWM circuit 114 compares the current control signal with a carrier wave, e.g., a triangular wave at 1-2 kHz, provided by the carrier generating circuit 115 to produce a PWM signal with a pulse width dependent on the values of voltage difference and current difference. The PWM signal is fed to the drive circuit 116, which operates the switching devices of the converter 1 accordingly.

The conventional power converter control circuit arranged as described above is intended to be responsive to an abrupt fall of the d.c. output voltage $V_D$ through the addition of the load current $I_L$ signal on a feed-forward basis to the voltage control signal for producing the input current command $I_{SS}$. Consequently, in case of a single-phase inverter for the load 5, the load current $I_L$ has a significant amount of ripple, which appears in the input current command $I_{SS'}$ resulting disadvantageously in an increased harmonics included in the input current $I_S$ waveform.

SUMMARY OF THE INVENTION

This invention is intended to overcome the foregoing prior art deficiency, and its prime object is to provide a power converter control circuit which alleviates the fall of d.c. output voltage caused by an abrupt change in the load and also relieves the control system from the influence of load current ripples.

The invention resides in the power converter control circuit which evaluates the mean value of load current and produces a feed-forward signal on the basis of the mean value.

Other objects and advantages of this invention will become more apparent from the following detailed description of specific embodiments taken in conjunction with the accompanying drawings.

DETAILED DESCRIPTION OF THE PREFERRED EMBODIMENT

Figure 1:
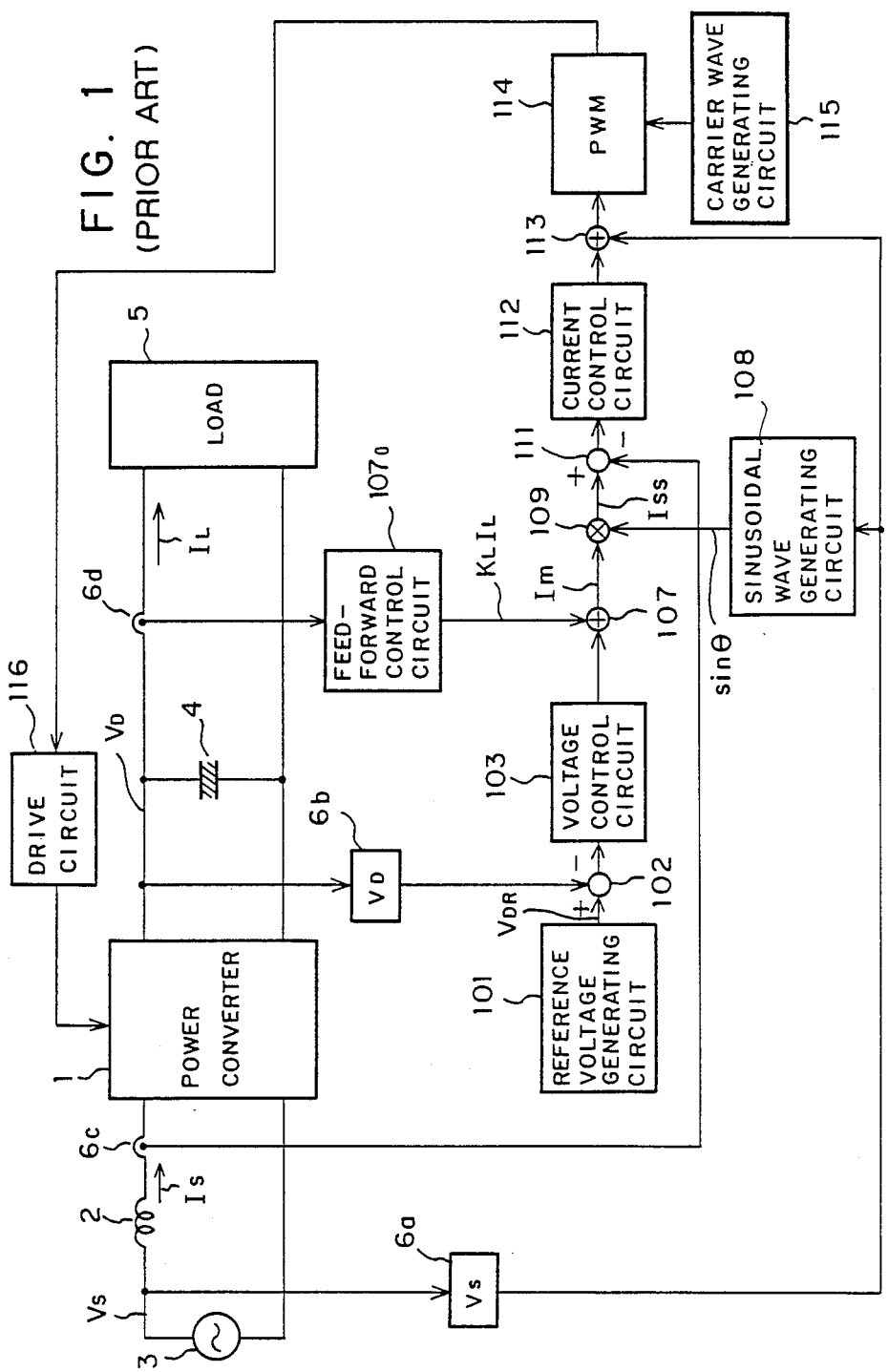
FIG. 1 is a block diagram of the conventional power converter control circuit.
Figure 2:
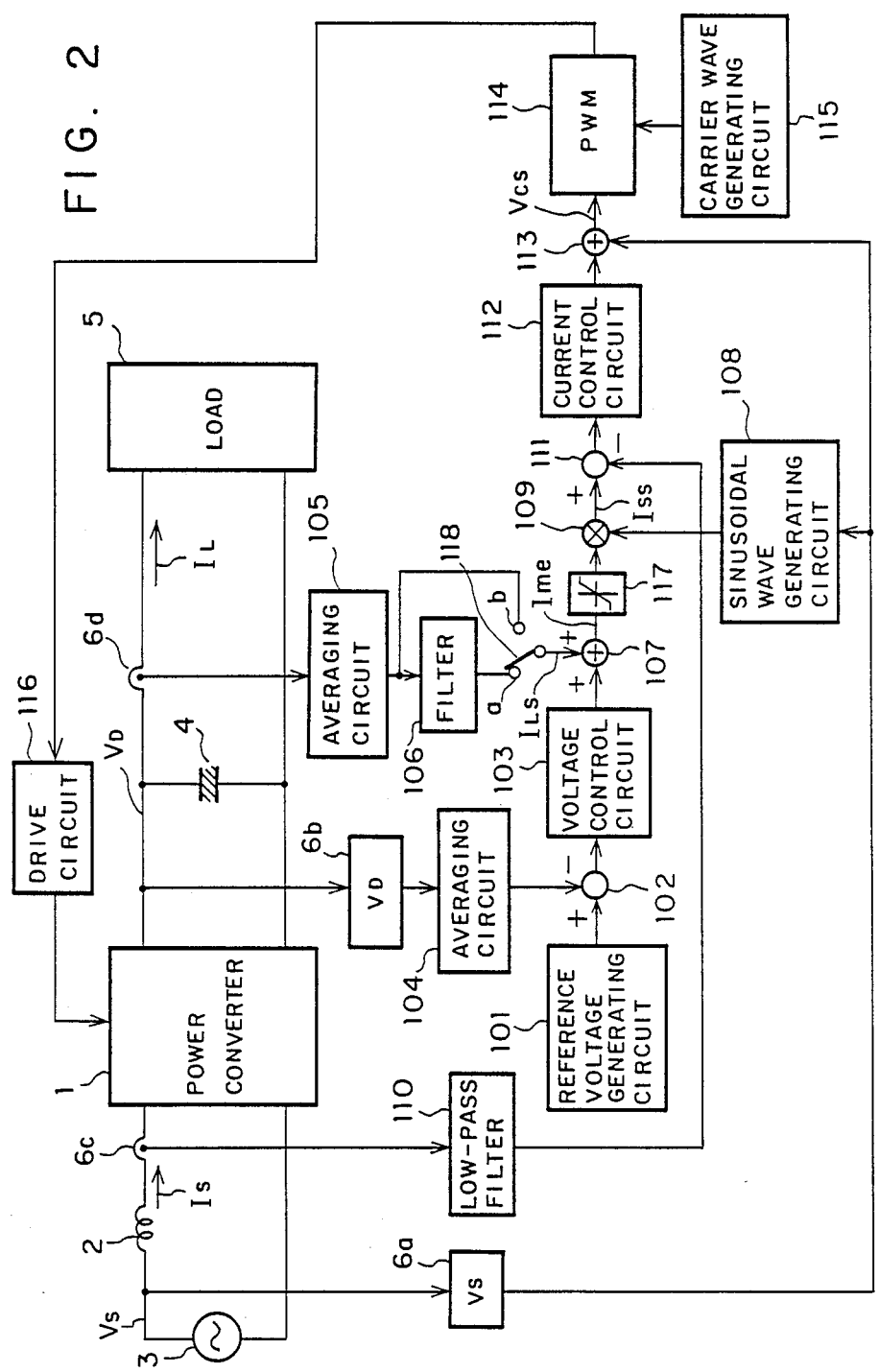
FIG. 2 is a block diagram of the power converter control circuit embodying the present invention.

An embodiment of this invention will be described with reference to the drawings. In FIG. 2, where portions identical to those in FIG. 1 are given the common symbols and explanation thereof is not repeated, indicated by 104 is an averaging circuit placed between the detection circuit 6b and subtracter 102, 105 is an averaging circuit placed between the detection circuit 6d and adder 107, 106 is a filter which passes the output of the averaging circuit 105, 118 is a switch which delivers selectively the output of averaging circuit 105 or the output of filter 106 to the adder 107, 117 is a limiter placed between the adder 107 and multiplier 109, and 110 is a low-pass filter placed between the detection circuit 6c and subtracter 111.

Figure 3:
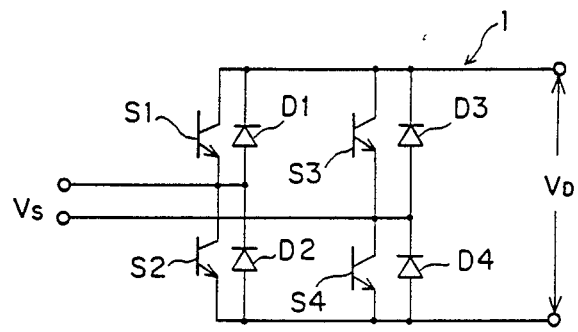
FIG. 3 is a schematic diagram of the converter according to the embodiment.

FIG. 3 shows a specific circuit arrangement of the converter 1. The converter 1 comprises rectifying diodes D1-D4 in a bridge configuration and switching devices, e.g., transistors, S1-S4 in anti-parallel connection with the respective diodes D1-D4. The converter 1 is of the voltage type, in which the switching devices S1-S4 operate several times in a period of power frequency in response to the dive signal from the drive circuit 116.

Next, the operation of the inventive control circuit shown in FIG. 2 will be described. The current command $I_{SS}$ is produced from the load current feed-forward signal $I_{LS}$ and power voltage $V_S$ so that the input current $I_S$ has an instantaneous response to the load by a minor current loop, and the d.c. output voltage is controlled to the reference voltage $V_{DR}$ by a major voltage loop.

First, the major voltage control loop will be described. The voltage control system consists of the circuitries 101-109, 117 and 118, and it is shown in more detail in FIG. 4. Moving average circuits are employed for the averaging circuits 104 and 105. Moving average is a technique of digital control in which detected values are sampled at a sampling interval Ts and a certain number of sampled data of new sampled values are averaged. For example, when the d.c. output voltage $V_D$ including periodic ripples is averaged for every six data, the result of moving average of d.c. output voltage $V_D$ at a time between KTs and (K+1)Ts is given as follows.

$$\frac{1}{6}\{V_{D(K)} + V_{D(K-1)} + V_{D(K-2)} + V_{D(K-3)} + V_{D(K-4)} + V_{D(K-5)}\}$$

The moving average at a time between (K+1)Ts and (K+2)Ts is as follows.

$$\frac{1}{6}\{V_{D(K+1)} + V_{D(K)} + V_{D(K-1)} + V_{D(K-2)} + V_{D(K-3)} + V_{D(K-4)}\}$$

By determining the number of data for averaging depending on the period of ripple in this way, the moving average value becomes a virtually constant value, and the influence of ripples on the control operation is eliminated.

Figure 4:
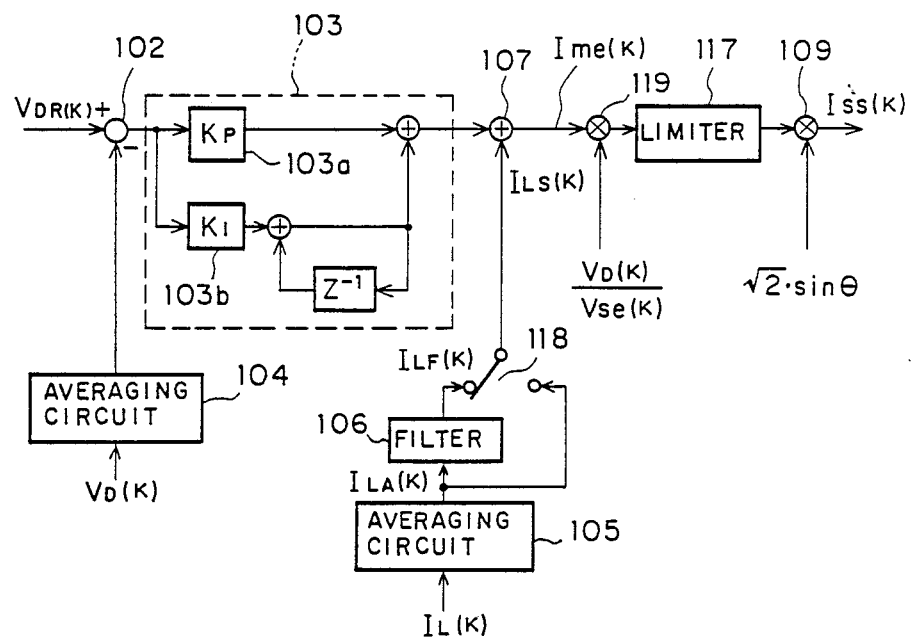
FIG. 4 is a block diagram of the voltage control circuit.
Figure 5:
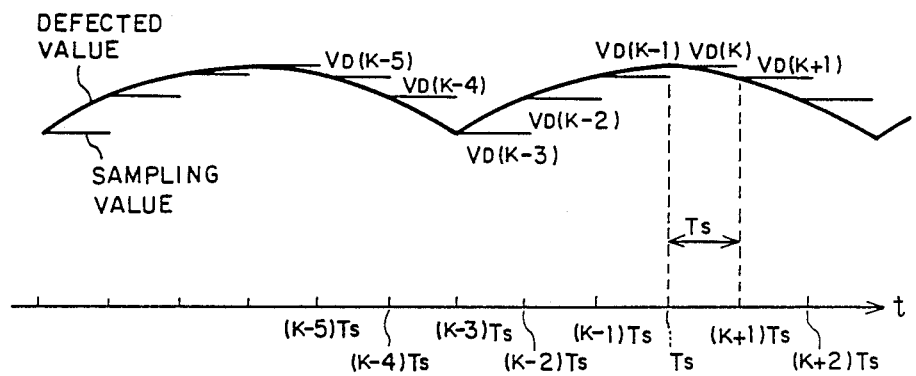
FIG. 5 is a diagram used to explain the principle of moving average in the sampling control.

In FIG. 4, the subtracter 102 calculates the voltage difference from the mean value of d.c. output voltage $V_D$ provided by the moving average circuit 104 and the reference d.c. voltage $V_{DR(K)}$, and delivers the result to the voltage control circuit 103. The voltage control circuit 103 consists of a proportional operator 103a which multiplies a constant $K_P$ to the input, and an integral operator 103b which sums the input multiplied by a constant $K_I$ and the multiplied result retarded by a delay element $Z^{-1}$. The voltage control signal produced by the voltage control circuit 103 is added to the feed-forward signal $I_{LS(K)}$ by the adder 107.

Figure 6:
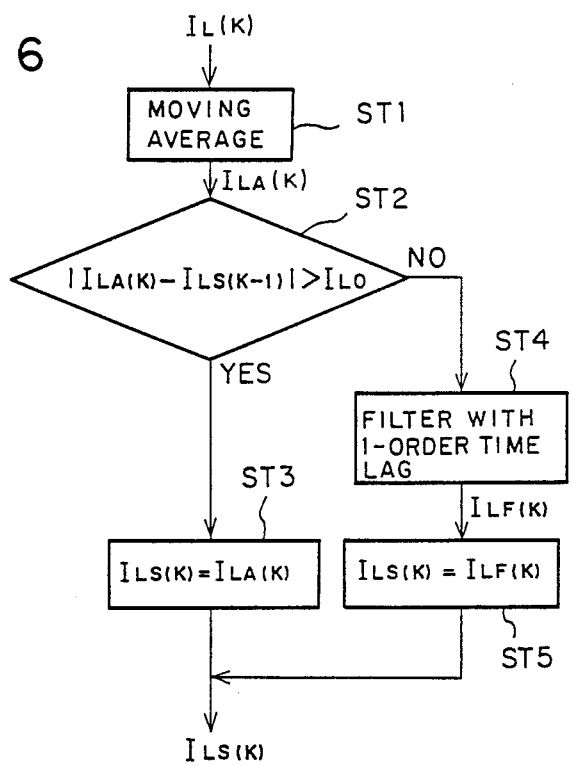
FIG. 6 is a flowchart showing the creation of the feed-forward signal derived from the load current.

The creation of the feed-forward signal $I_{LS(K)}$ will be described on the flowchart of FIG. 6. A moving average circuit is assumed for the averaging circuit 105. Initially, step ST1 evaluates the moving average value $I_{LA(K)}$ from the load current detected value $I_{L(K)}$. Next step ST2 calculates the difference between the moving average value $I_{LA(K)}$ and the feed-forward signal $I_{LS(K-1)}$ of the preceding sample point, and tests whether the difference is greater than a certain preset value $I_{LO}$. If the difference is greater than $I_{LO}$, step ST3 operates on the switch 118 to select the b-position so that the then moving average value $I_{LA(K)}$ is delivered as a feed-forward signal $I_{LS(K)}$ to the adder 107. In another case when the difference does not exceed $I_{LO}$ step ST4 operates on the switch 118 to select the a-position so that the moving average value $I_{LA(K)}$ is fed through a filter 106 having certain 1-order time lag characteristics, and step ST5 delivers the resulting feed-forward signal $I_{LF(K)}$ as a feed-forward signal $I_{LS(K)}$ to the adder 107.

Figure 7A:
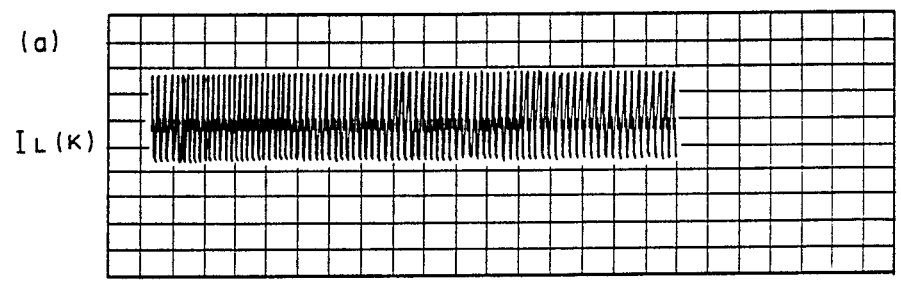
FIGS. 7(a)-7(c) are a set of waveform diagrams obtained by simulation.
Figure 7B:
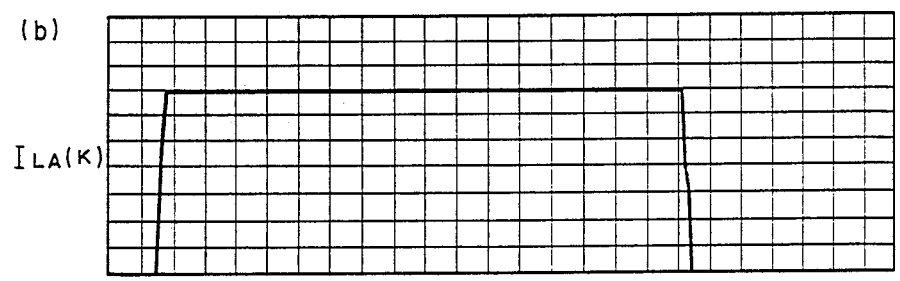
Figure 7C:
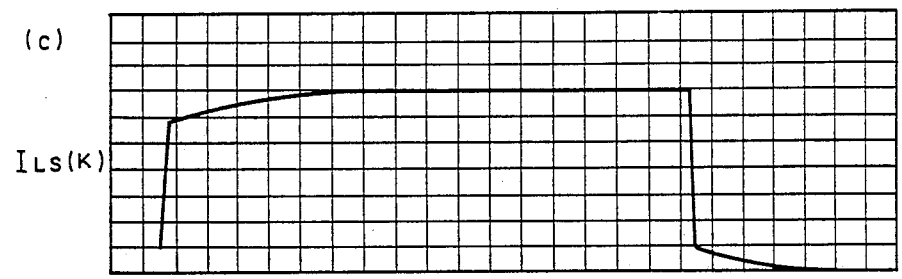

FIGS. 7(a)-7(c) show simulated waveforms for a single-phase inverter for the load 5, with the preset value $I_{LO}$ being 25% of the rated current. Shown by 7(a) is the load current $I_{L(K)}$ at the input of the inverter, and it includes many harmonics. Shown by 7(b) is the moving-averaged load current $I_{LA(K)}$, and shown by 7(c) is the feed-forward signal $I_{LS(K)}$. It is observed on the waveform that the feed-forward signal $I_{LS(K)}$ promptly follows a sharp fall of the load current $I_{L(K)}$.

Referring back to FIG. 4, the adder 107 has its output representing the effective current command $I_{me(K)}$ for the d.c. output of the converter 1. In order to convert the effective current command $I_{me(K)}$ to the input current command $I_{SS(K)}$ for the a.c. converter input, a multiplier 119 multiplies the mean value $V_{D(K)}$ of d.c. output voltage $V_D$ by the $I_{me(K)}$ and divides the result by the effective value $V_{se(K)}$ of power voltage $V_S$. The output of the multiplier 119 is clamped by the limiter 117 to the allowable current of the converter 1, and then applied to the multiplier 109. The multiplier 109 multiplies a waveform $\sqrt{2}\sin\theta$ in phase with the power voltage $V_S$ to the output of the limiter 117, and the input current command $I_{SS(K)}$ is obtained.

Figure 8:
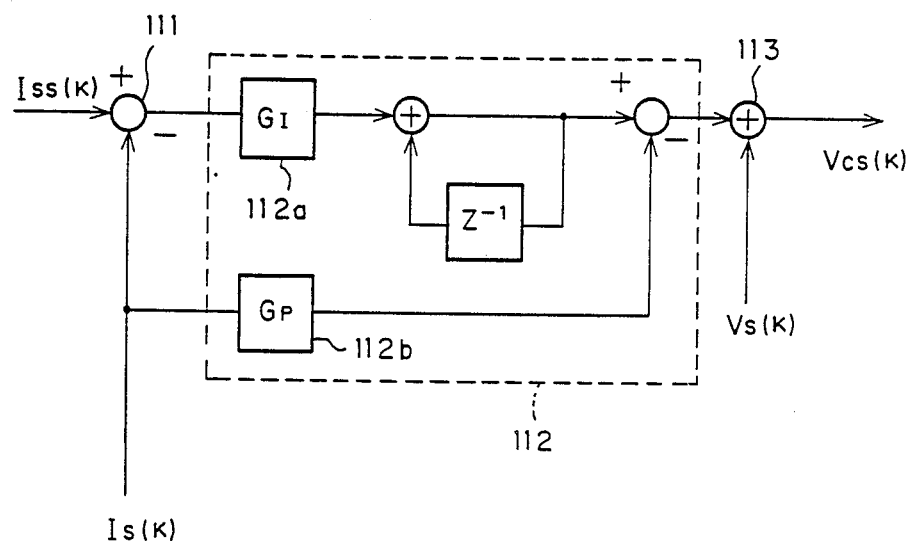
FIG. 8 is a block diagram of the current control circuit.

Next, the minor current loop will be described. This current control system is formed by sections 111–113 in FIG. 2, and it is shown in more detail in FIG. 8. In the figure, the input current $I_S$ detected value is rid of ripple components by a low-pass filter 110 (see FIG. 1). The resulting signal $I_{S(K)}$ is applied to the subtracter 111 for subtraction from the input current command $I_{SS(K)}$ and the current difference is evaluated, which is delivered to the current control circuit 112. The current control circuit 112 consists of an integral operator 112a which sums the output of the subtracter 111 multiplied by a constant $G_I$ and the multiplied result retarded by a delay element $Z^{-1}$, and a proportional operator 112b which multiplies a constant $G_P$ to the detected value $I_{S(K)}$. The integral operator 112a and proportional operator 112b have their outputs merged and then added to the detected value $V_{S(K)}$ of power voltage $V_S$ by the adder 113, resulting in a control signal $V_{CS(K)}$. The control signal $V_{CS(K)}$ is delivered to the succeeding PWM circuit 114, by which it is compared with the carrier, and the switching devices S1–S4 of the converter 1 are controlled for their switching operation. The foregoing minor current control loop reduces the retardation, allowing an increased loop gain, whereby the total system has an instantaneous response.

Through the foregoing operations, the d.c. output voltage $V_D$ is maintained constant, and the input current $I_S$ is controlled to be a sinusoidal current with lower distortion factor and in phase with the power voltage $V_S$. By employment of moving average circuits for the averaging circuits 104 and 105, the ripple component of the 2-fold output frequency is eliminated in the case of a single-phase inverter or the like for the load 5. The feed-forward signal $I_{LS}$, by being fed through the filter 106, is rid of the ripple caused by sampling for the averaging process, whereby the input current command $I_{SS}$ includes fewer harmonics.

Figure 9:
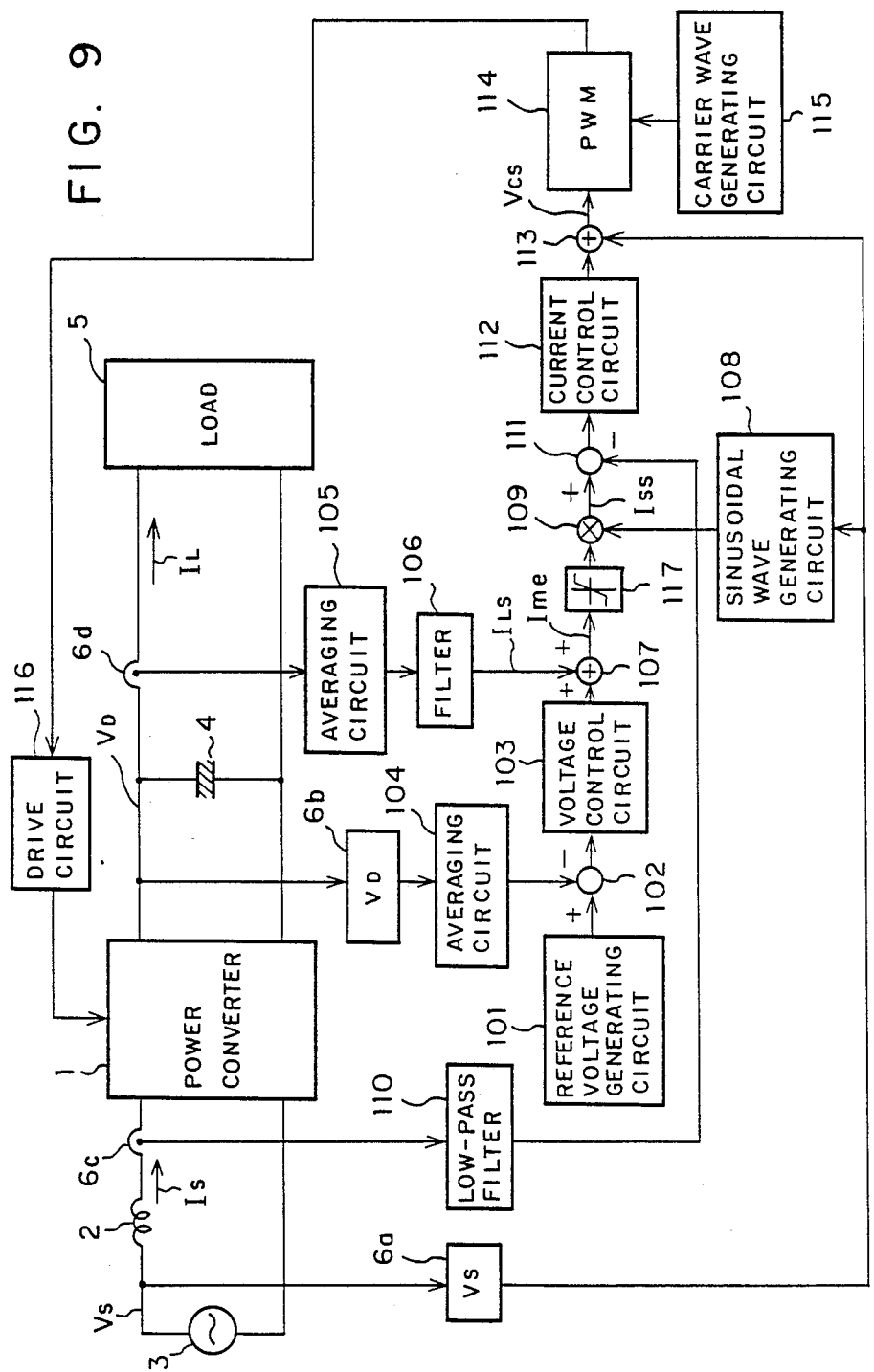
FIG. 9 is a block diagram showing another embodiment of this invention.

Although in the foregoing embodiment the feed-forward control system for providing the load current $I_L$ detected value for the control circuit is designed to use the moving average value $I_{LA}$ directly as a load current feed-forward signal $I_{LS}$ instead of passing it through the filter 106 when the $I_{LA}$ exceeds a certain preset value $I_{LO}$, this treatment of direct feed-forward signal is not necessary in cases where the moving average value of load current does not vary greatly. Accordingly, the switch circuit 118 as shown in FIG. 9 can be removed, and yet the same effectiveness as the preceding embodiment is achieved.

Although in the foregoing embodiment the voltage control circuit 103 and current control circuit 112 are formed in a digital control system, the whole or part of the inventive control circuit may be configured by analog control circuitries, and yet the same effectiveness as the preceding embodiment is achieved.

According to this invention, as described above, the load current feed-forward control system is designed to use a detected value averaging circuit, and it alleviates the influence of load current ripples on the control system and is also effective for controlling the converter input current to a sinusoidal current with lower distortion factor and in phase with the power voltage.

What is claimed is:

1. A control circuit for a power converter which converts a.c. power to d.c. power, comprising:
    voltage control means for controlling d.c. output voltage from a power converter to be constant;
    current control means for controlling input current to said power converter to be in-phase with input voltage to said power converter;
    a first averaging circuit which averages a detected load current of said power converter and supplies the result of said averaging as a selectable output to said voltage control means for use in said d.c. output voltage control;
    a filter coupled to said averaging circuit for filtering said result and outputting said filtered result as a selectable output to said voltage control means; and
    switch means for selecting one of said outputs from said averaging circuit and said filter to be supplied to said voltage control means in the control of said d.c. output voltage.

2. A power converter control circuit according to claim 1, wherein said power converter comprises a plurality of rectifying diodes in bridge configuration and switching devices each in antiparallel connection with a corresponding one of said diodes.

3. A power converter control circuit according to claim 2, wherein said switching devices comprises transistors.

4. A power converter control circuit according to claim 1, wherein said averaging circuit comprises a moving average circuit.

5. A power converter control circuit according to claim 1, wherein said voltage control means comprises a second averaging circuit which averages said d.c. output voltage from said power converter;
    a subtracter which subtracts the output of said second averaging circuit from an output of a reference voltage generation circuit to produce a voltage difference signal;
    a voltage control circuit which receives said voltage difference signal and produces a voltage control signal;
    a first adder which sums said voltage control signal and the output of said first averaging circuit;
    a limiter which receives the output of said first adder; and
    a multiplier which multiplies the output of said limiter by a sinusoidal output from a sinusoidal wave generation circuit to produce an input current command value;
    and wherein said current control means comprises a subtracter which subtracts said input current from said input current command value to produce a current difference value;
    a current control circuit which produces a current control signal depending on said current difference value; and
    a second adder which adds said input voltage to said current control signal.

6. A power converter control circuit according to claim 5, wherein said voltage control circuit comprises a proportional part section which multiplies a constant by said voltage difference value, an integral part section, a third adder which sums an output of said integral part section and an output of a delay element, and a fourth adder which sums an output of said proportional part section and the output of said third adder.

7. A power converter control circuit according to claim 5, wherein said current control circuit comprises an integral part section which multiplies a constant by said current difference value, a proportional part section which multiplies a constant by a detected input current, a current signal adder which sums an output of said integral part section and an output of a delay element, and a subtracter which subtracts an output of said proportional part section from an output of said current signal adder adder.

* * * * *

UNITED STATES PATENT AND TRADEMARK OFFICE
CERTIFICATE OF CORRECTION

PATENT NO. : 4,891,744
DATED : January 2, 1990
INVENTOR(S) : YUSHIN YAMAMOTO ET AL.

It is certified that error appears in the above-identified patent and that said Letters Patent is hereby corrected as shown below:

ON TITLE PAGE: [19], line 2, "Yamamoto, Yushin et al" should be --Yamamoto et al.--;
[75], line 2, delete comma, (second occurrence);
[73], line 1, "Kaubshiki" should be --Kabushiki--;

Col. 3, line 40, "dive" should be --drive--.

Signed and Sealed this

Tenth Day of September, 1991

Attest:

HARRY F. MANBECK, JR.

*Attesting Officer*     *Commissioner of Patents and Trademarks*